(12) United States Patent
Burke

(10) Patent No.: US 12,461,300 B1
(45) Date of Patent: Nov. 4, 2025

(54) LIGHT CONDUIT MULTIFUNCTION LIGHT

(71) Applicant: John J Burke, Tampa, FL (US)

(72) Inventor: John J Burke, Tampa, FL (US)

( * ) Notice: Subject to any disclaimer, the term of this patent is extended or adjusted under 35 U.S.C. 154(b) by 45 days.

(21) Appl. No.: 18/900,799

(22) Filed: Sep. 29, 2024

Related U.S. Application Data

(60) Provisional application No. 63/541,892, filed on Oct. 1, 2023.

(51) Int. Cl.
*G01J 1/42* (2006.01)
*F21V 8/00* (2006.01)
*G01J 1/04* (2006.01)

(52) U.S. Cl.
CPC ............ *G02B 6/001* (2013.01); *G01J 1/0425* (2013.01); *G01J 1/4204* (2013.01)

(58) Field of Classification Search
CPC ........ G02B 6/001; G01J 1/0425; G01J 1/4204
See application file for complete search history.

(56) References Cited

U.S. PATENT DOCUMENTS

| | | | | |
|---|---|---|---|---|
| 8,573,823 | B2 * | 11/2013 | Dau | F21V 7/0016 362/560 |
| 2009/0021954 | A1 * | 1/2009 | Burke | B63B 45/04 362/477 |
| 2010/0096991 | A1 * | 4/2010 | Burke | B63B 45/04 362/477 |
| 2012/0039081 | A1 * | 2/2012 | Burke | G02B 6/0008 362/477 |
| 2017/0090102 | A1 * | 3/2017 | Holman | G02B 6/0046 |
| 2020/0116836 | A1 * | 4/2020 | Pacala | H10F 39/806 |
| 2020/0374995 | A1 * | 11/2020 | Bretschneider | G02B 6/0045 |

* cited by examiner

*Primary Examiner* — Fatima N Farokhrooz

(57) ABSTRACT

A multifunction total internal reflection (TIR) and partially frustrated TIR device is disclosed, comprising a light source, light source driver, high-speed light sensor, programmable microcontroller, information storage device, and a light conduit. The device uses a bidirectional light conduit to convey light both from the light source to an emission point and for conduction of ambient light back to the light sensor. The high-speed light sensor detects ambient near infrared light. A dark flash operation is implemented, wherein the light source is rapidly turned off to measure ambient light and then turned back on, with the cycle being undetectable to human perception. The microcontroller controls the light source driver, processes sensor data, and operates in user-selectable modes, with the modes stored in a non-volatile information storage device. The system allows efficient light emission, ambient light sensing, and dynamic light control in various operational modes.

10 Claims, 5 Drawing Sheets

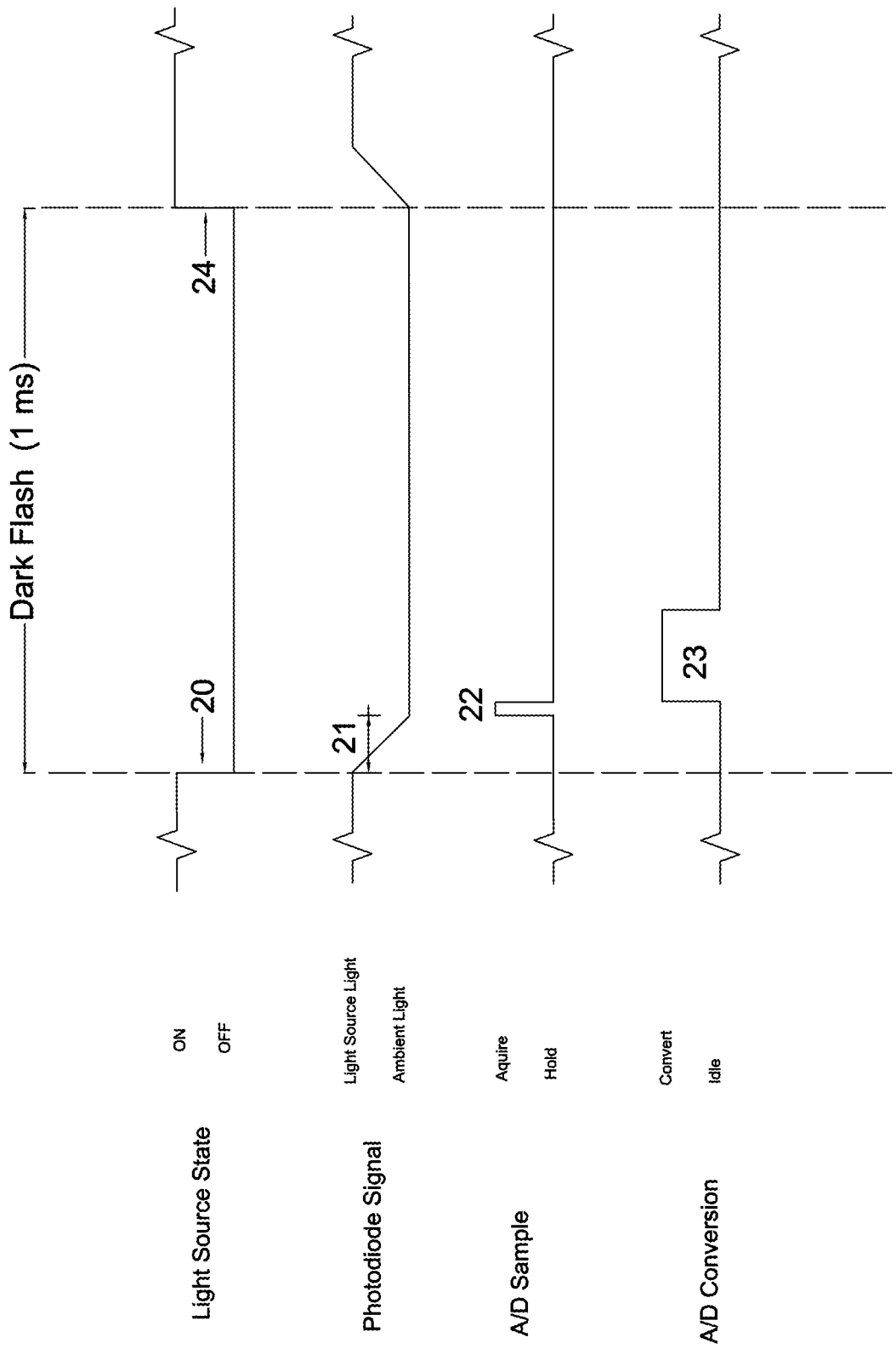

LIGHT CONDUIT MULTIFUNCTION LIGHT

This application claims priority of provisional application 63/541,892, filed 1 Oct. 2023.

BACKGROUND OF THE INVENTION

1. Field of the Invention

The present invention has application to marine navigation lights that utilize light coupling to a light conduit. It is further applicable to non-navigation lights that use light coupling to a light conduit technology. It applies to both fixed and detachable light conduits, as well as TIR and frustrated TIR light conduits.

2. Background

Marine navigation lights in the US are regulated by the USCG. Marine navigation lights comprise boats, buoys, hazard and other markers. Some buoys and hazard markers have light detection incorporated such that they turn on at night and off during the day. These typically flash at duration and intervals which are preassigned. The light sensors are typically adjacent to or sometimes incorporated into solar charging systems. The discussion regarding boat navigation lights that follows is mostly referencing recreational boats. However, in general, as stated previously, it applies to all navigation and non-navigation lights utilizing light coupling to a light conduit. It applies to any boat which has navigation lights. Boat navigation lights are almost exclusively controlled manually, especially in recreational boats. That is, they are turned on via a switch that applies or removes electrical power, thereby turning the lights on and off. Boat navigation lights are required to not interfere with the operator's night vision, that is, they may not shine in the eyes of the operator directly or indirectly so as to reduce night vision. This typically means they cannot be easily seen to be on or off by the operator. Therefore, it is not uncommon for boats to be operating or anchored after dark without the required navigation lights on.

Boats at anchor are required to have an all-around white light at night. Many boats arrive at anchorage during the day and may not even be manned at dusk or during the night. In that scenario, either someone must travel to the boat at dusk to turn on the light or the light must be left on, resulting in unnecessary battery drain. It is possible to connect a separate light sensor to perform the on/off function automatically. This entails additional wiring and placement of the sensor. One classic problem with such sensors is they must be placed facing the sky, exposing them to bird droppings, salt and dust accumulation. In many cases said sensors may not be able to be placed near the navigation lights as these are often on or near deck level and would be vulnerable to damage from typical boating activities, such as fishing, skiing, etc., thereby complicating the installation.

Another possible issue with such sensors is the possibility of light feedback. Without careful placement, when the sensor detects low light, it turns the light on, then detects said light, turning it off again—an oscillatory condition.

Further, present navigation lights are single function, that is they only perform one function-navigation light compliance. The same can be said for many non-navigation lighting applications-they perform one function only.

Non-navigation lights are available in various forms, including daylight sensing that can automatically turn lights on at night and off in the day. Again, the daylight sensor is separate from the light emitting device itself, although it might be incorporated in the same area or solar panels, if present.

The invention overcomes the issues with present navigation and non-navigation light regarding daylight sensing, is a rugged, compact device and makes available a plethora of new functions to existing and new applications.

SUMMARY OF THE INVENTION

Light coupled light conduit lights, for example as in Burke US20090021954A1 convey light from a light source into the light conduit proximal end, which then conveys the light by TIR (total internal reflection) to a distal end where it is largely emitted. The term light conduit here is as used in Burke and in general form is a large diameter optical fiber, although it has some characteristics not typically found in optical fibers such as rigidity and redirected emission. Of course, thinner diameter fibers are more flexible, so that characteristic can be tuned to some extent. The redirection mechanism can also be varied or even absent in the present invention, as it is not required for operation in non-navigational lights.

Light, for the purposes of the invention, comprises the visible spectrum, infrared and combinations thereof.

The light conduit is bidirectional in nature regarding light conduction. In the normal light emission operating mode, light enters the proximal end, is conveyed via TIR to the distal end and is there emitted directly or via a redirection device, typically an optical discontinuity. However, the light can be conducted in the reverse direction as well. Light can enter the conduit at the distal end and be conveyed via TIR to the proximal end. There it is emitted into what is normally the light source.

The invention adds multiple capabilities to standard navigation lights by incorporating a light source that can be turned on and off electronically, a programmable microcontroller, a means to store information that survives power cycling and a light sensor to detect ambient light. It utilizes the bidirectional capabilities of the light conduit to convey ambient light to the light sensor. The use of the light conduit for both conveying and emission of light from a light source and receiving ambient light and conveying it to a light sensor is novel in navigation lighting applications and in outdoor lighting applications in general.

The light conduit as an ambient light gathering and conveying device as well as a light emission device offers advantages over typical light sensors as it does not need to have a separate light gathering surface as conventional light sensors do. In fact, in the case of the navigation light, ambient light is gathered horizontally by the same redirection device (reflector) that emits light horizontally in the light emission mode. The remote-from-the-sensor light gathering (i.e. via the distal end of the light conduit) design places the light gathering at a location that is optimal to do so, i.e. away from structures that obscure the transmission and reception of light. Further, the light sensor incorporated into the light source module and the light conduit gathering the ambient light creates a compact and robust design that is well suited for the marine environment, as well as outdoor applications in general. That same feature eliminates light source-sensor feedback, a bothersome oscillatory phenomenon, as the light source is disabled during ambient light detection.

The programmable microcontroller and associated circuits of the invention are capable of adding functions such as automatic on at dark and off at daylight, SOS distress signal light mode and a traditional on/off light mode that is switch controlled. Additional capabilities such as programmable light flashing, which is applicable to some buoys and markers and time delayed on or off are also possible. Additionally, the light source intensity can be controlled by the microcontroller by high frequency PWM. Supply voltage monitoring and reduced light output can also be included for battery operation in some applications. Combining the light sensor, light source intensity control and microcontroller enable an automatic brightness control function. The list of programmable functions here is not intended to be limiting and any function that can be added through programming and use of the capabilities of the microcontroller and associated circuits are possible.

In the broadest form, the invention applies not only to marine or other navigation lights but any light conduit light coupled light. Applications may or may not utilize all of the available functions (modes).

Examples of other applications include, but are not limited to, runway and warning lights for aviation, outdoor lighting of buildings, landscaping, walkways, roadways, docks, boat lifts, boat trailer guides and for marking locations during civilian and military search and rescue missions.

BRIEF DESCRIPTION OF THE DRAWINGS

The following drawings illustrate the best modes presently contemplated for carrying out the present invention (Preferred Embodiment).

DETAILED DESCRIPTION THE INVENTION

Figure 1:
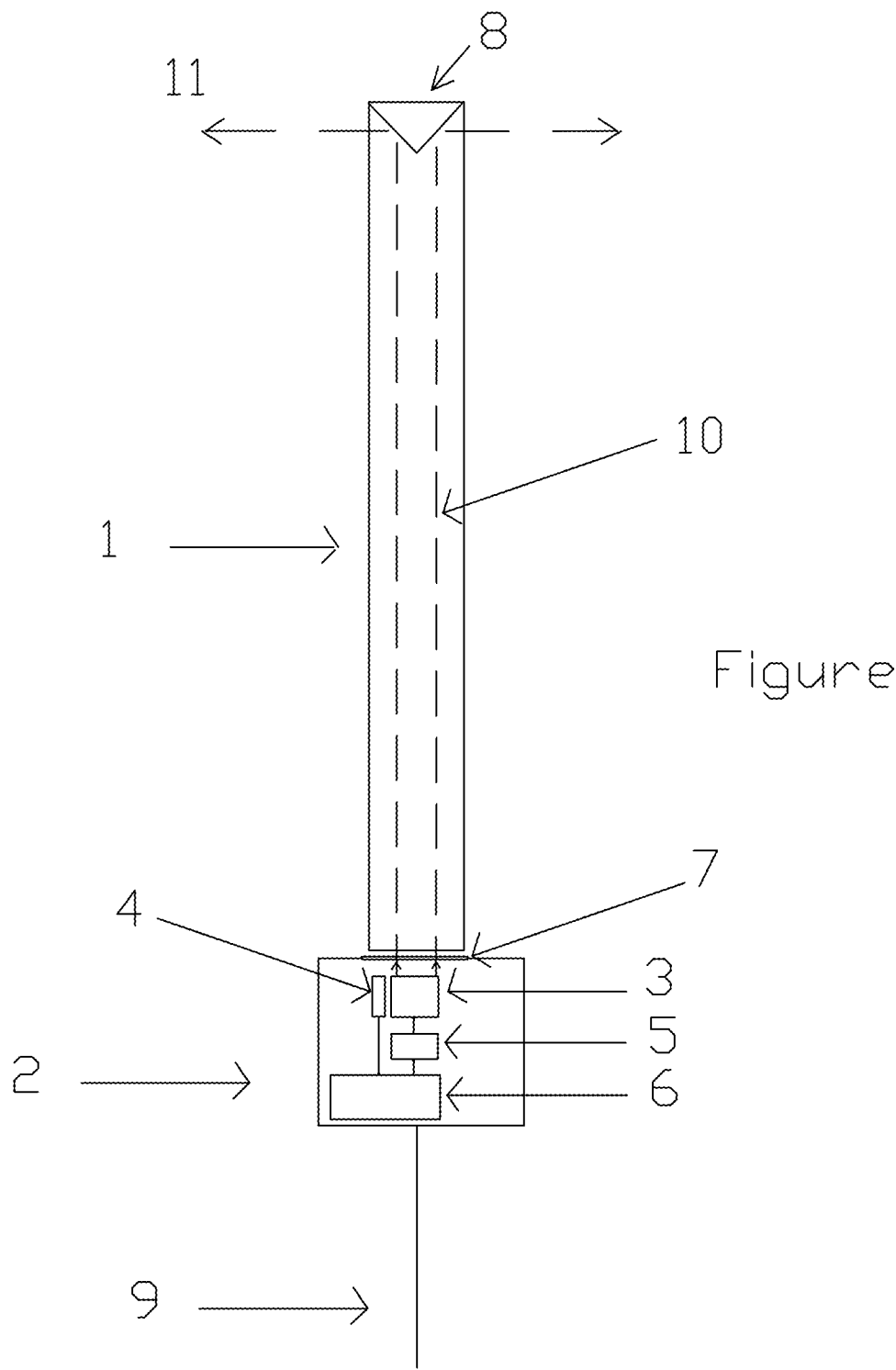
FIG. 1 Cross Section View of components with Light On
FIG. 2 Cross Section View components with of Light Off-Ambient Light Sensing
FIG. 3 Circuit Block Diagram
FIG. 4 Frustrated TIR Light Conduit Illustration
FIG. 5 Dark Flash Illustration

In the following section, one embodiment of the invention is explained in detail.

The invention is not intended to be limited in its application to the details of construction and to the arrangements of the components described in the following description or illustrated in the drawings. The invention is capable of other embodiments and of being practiced and carried out in various ways.

The phraseology and terminology employed herein are for the purpose of description and should not be regarded as limiting.

It is the intention of the invention to provide a new kind of multifunction light that has applications to marine and other navigation lights as well as general purpose lighting. The invention has multiple functions (modes) that can be incorporated into light coupled, light conduit lights.

Principle of Operation

Light conduit type lights utilize the ability of the light conduit (essentially a large optical fiber) to convey light from a source (e.g. LED) efficiently via TIR from the proximal end to the distal end for emission. The invention utilizes the same light conduit operating in the reverse direction (with the light source turned off) to convey ambient light from the distal end to the proximal end and enter the module which contains a light sensor and a light source. Of course, multiple sensors and/or light sources can be utilized. Both visible and infrared light sources can be used alone or in combination.

Said module further contains a programmable microcontroller, an information storage device that survives power cycling (e.g. battery backed up RAM, EEPROM and the like), and a light source driver that can be turned on and off by the microcontroller. These components are used to implement some of the features of the invention. All of the components may or may not be present in all embodiments of the invention.

In the preferred embodiment, the various functions (modes) are selectable by a user via a sequence of power application and removal, coordinated with the flashing of the light by the microcontroller, which signals to the microcontroller the desired mode. Modes are indicated to the user by the number of times the light flashes after powerup.

In another embodiment, the various function (mode) selection is accomplished via wireless communication, examples include, but are not limited to, Wi-Fi and Bluetooth.

In yet another embodiment, the mode selection is controlled via infrared light communication, said communication utilizes the same light path used for measuring ambient light, to receive encoded light pulses according to a protocol. Likewise, an infrared light source emitting into the light conduit could be used to transmit microcontroller information, thus enabling two-way communication via infrared.

DETAILED DESCRIPTION

Components

Referring to FIG. 1, the invention is comprised of two primary components, the light conduit 1 and the module 2.

The light conduit 1 is comprised of a proximal end, a distal end and a light redirection device 8. It has the optical characteristics that it confines and efficiently conveys light internally by TIR.

The light conduit 1 has the physical characteristics of an optically clear solid rod made of material that efficiently conducts light and has an index of refraction that supports TIR in ambient air. The diameter is not critical and is primarily determined by the proximal end surface area needed to couple the light source radiation pattern. Another diameter consideration is structural integrity, larger diameters being sturdier, smaller being more flexible. Likewise, the length of the light conduit rod is not critical. An example of typical lengths for navigation lights is 1-4 ft, although that is not intended to be limiting as, it can be of nearly any length required in the application. The preferred embodiment utilizes cast acrylic material. Other materials that exhibit TIR in air may also be utilized. Other examples include, but are not limited to, extruded acrylic, polycarbonate and glass.

The light conduit may further comprise a light redirection device 8. Said device comprises a surface that is an optical discontinuity. In the preferred embodiment, it is formed by a 45 deg cone at the distal end of the light conduit 1. Said cone may be machined into the distal end of the light conduit or be a separate piece attached to the distal end. Neither the means of forming the redirection device 8 nor its angle is intended to be limiting. Other means and angles may be suitable as well.

If the redirection device 8 is not present, then light emerges out of the distal end directly.

The module 2 structure of the preferred embodiment is comprised of aluminum, although any material suitable for use in marine environments is acceptable. Other examples include, but are not limited to, plastic, brass and stainless steel. The module has an optical window 7 which comprises a transparent path for light to enter and leave the module. The window comprises a clear material that is flexible so that it remains adhered to the aluminum module through thermal expansion and contraction. It further comprises a seal to the outside environment that protects the internal components. Other forms of the window include, but are not limited to, acrylic, polycarbonate and glass, all of which may also be combined with flexible adhesion.

The module 2 further comprises optically clear encapsulation of the light source 3 and light sensor 4 adjacent to the optically clear window 7 to which the light conduit proximal end is light coupled. The remaining components, the light source driver 5 and microcontroller 6 may also be encapsulated. Their encapsulation may comprise various electrical potting materials that need not be optically clear and may include enhanced thermal conductivity to help dissipate internally generated heat. In the preferred embodiment the non-optical components are encased in thermally conductive epoxy potting to protect said components from the environment and help conduct heat from the components to the environment. The potting material and indeed the potting itself in the preferred embodiment are not intended to be limiting. A different potting material may be utilized. The potting may not be needed or desired in all applications.

The combination of acrylic light conduit and encapsulated module form a robust, compact and weather resistant multifunction light.

The module 2 is operable to connect to an electrical source by wires 9. Wires are used in the preferred embodiment but is not intended to be limiting, the connection could likewise be via terminals or any other applicable electrical connection means.

Optical Section

Figure 2:
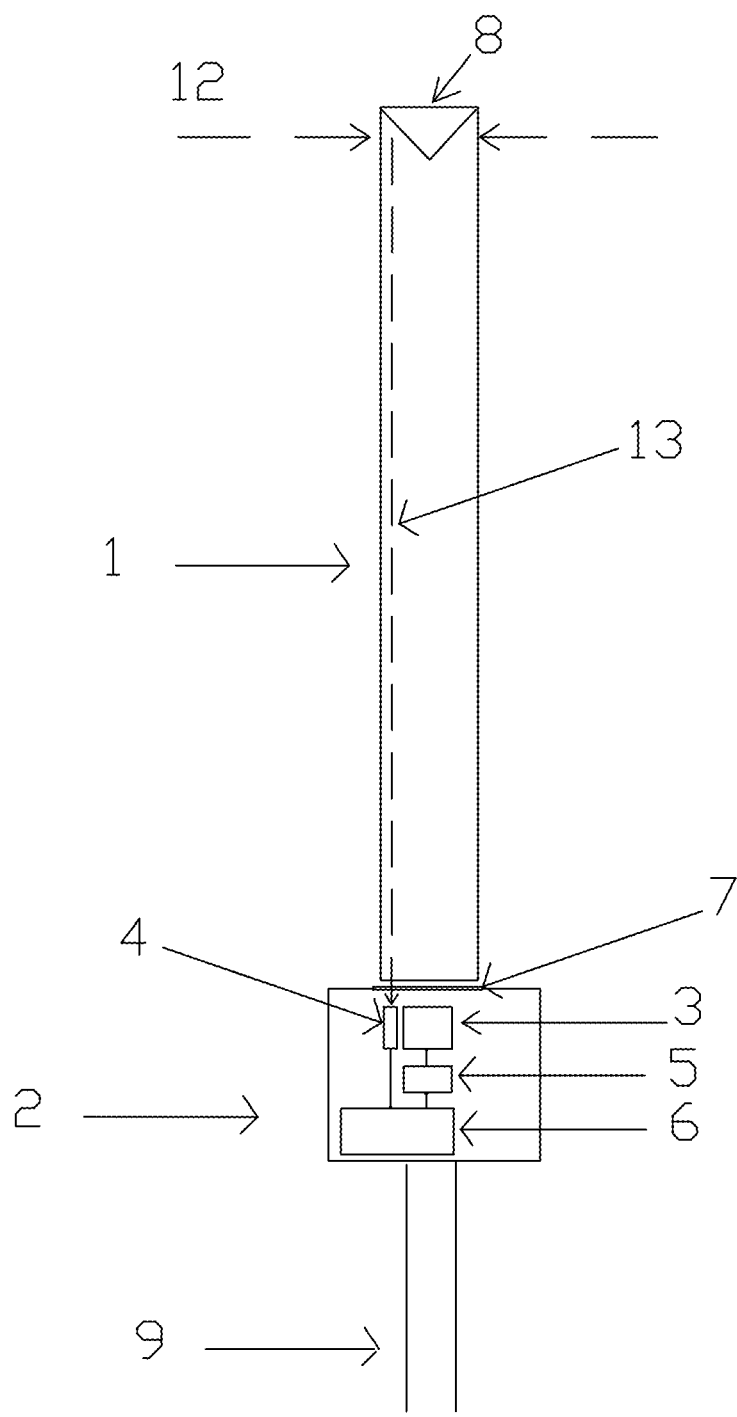

Referring to FIG. 1, the optical section is comprised of the light conduit 1, the light redirection device 8, the LED light source 3 and the light sensor 4. When the light is on (emitting light), the LED 3 is energized and transmits light via the module window 7 into the proximal end of the light conduit 1. The light then travels via TIR 10 to the distal end, encounters the redirection device 8 and is emitted 11. The light source can comprise many types, examples include but are not limited to, LED, incandescent, halogen, florescent and LASAR Referring to FIG. 2, when the device is sampling the ambient light, the LED light source 3 is deenergized. Ambient light 12 enters the distal end of the light conduit 1, is redirected by the light redirection device 8 and travels to the proximal end via TIR 13 and is emitted through the module window 7 to the light sensor 4.

The light redirection device 8 is not necessary for operation of the invention and may not be present in some embodiments. In that case, light would enter the light conduit at the distal end.

Electronic Section

Figure 3:
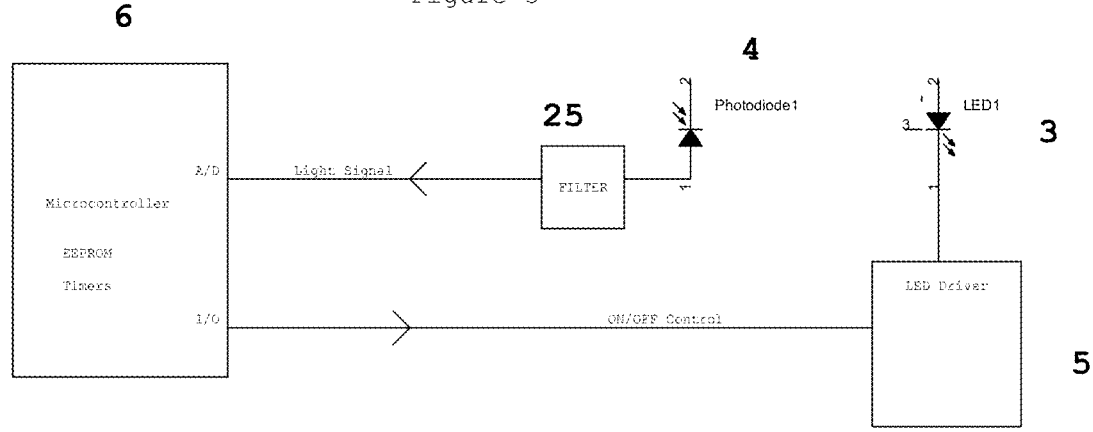

Referring to FIG. 3, the electronic components of the preferred embodiment comprise a microcontroller 6, a high-speed photo diode light sensor 4, an optional sensor signal filter 25, an LED 3 and an LED driver 5. The microcontroller 6 comprises an EEPROM, A to D converter, I/O, POR and programmable timers. In the preferred embodiment the microcontroller is an ATTINY426 or similar device. Other microcontrollers are operable to perform the functions herein described. As long as they comprise the above features or equivalent and are capable of preforming the functions required for the invention, they are suitable.

The light sensor 4 is a high-speed photodiode, high-speed in this context is light response times of 100 microseconds or less, vs 10s to 100s of milliseconds or longer of conventional ambient light detectors.

The LED 3 is a high intensity LED, such as the Cree XLAMP GP3 series. Many other suitable high intensity LEDs are available from various manufacturers. Suitable here means comparable specifications to said Cree device. The LED driver 5 is an IC, such as HV9918 or similar device, and associated components designed to drive high intensity LEDs. It has an on/off input which is controlled by the microcontroller 6.

The description of the electronic components here in the preferred embodiment is not intended to be limiting. Electronic component technology in general as well as LEDs and their drivers are constantly improving density and performance. It is anticipated that future technological improvements can be used to improve and enhance the invention. Other arrangements, components and component types are possible.

Mode Selection

In the preferred embodiment, the operating mode or function is selected by the following sequence: electrical power is applied and the user waits until the number of light flashes finishes, corresponding to the mode (e.g. 1-3 flashes). If the desired mode is currently selected, then nothing else is to be done and that mode is entered and retained. If the electrical power is subsequently turned off within a preset time window after the flash sequence completes, the next mode is selected. The time window duration is not critical and largely determined so as to allow the user to perceive the end of the flash sequence and react to it. Time durations of 1 to 10 seconds is typically adequate, although those are not intending to be limiting times. Any time duration that suits the application is acceptable.

In the case that the power was removed before the time window expired, upon the next powerup the next mode is indicated by the corresponding number of flashes. This process can be repeated to sequence through each of the operating modes to find the desired one. The number of times the power on-light flash-power off sequence needs to be repeated in order to change the operating mode is not critical and the number can vary to any count suitable for the application. The mode selection starts over after the last mode is indicated. Note that the operating mode selection is controlled via the proceeding process and requires no changes to the standard light installation. The preceding description is not intended to be limiting. Various schemes involving power on/off, light flashing and time windows are possible.

In another embodiment, the mode selection is controlled wirelessly. Examples of wireless control standards include, but are not limited to, Bluetooth, Zigbee and Wi-Fi. Those standards and others are well known in the art and are not recited here. Custom protocols may also be implemented. The wireless standards are available in off-the-shelf devices, most of which offer asynchronous communications interfaces which are compatible with most microcontroller USART peripherals. Therefore, since the microcontroller of the invention comprises a USART, interfacing said devices with the microcontroller of the invention adds said capability for operating mode programming, as well as two-way communication. Two-way communication enables other features that can be implemented via said wireless method. Said features comprise synchronous flashing, turning on or off, sequential light emission, exchange of data, firmware updates and combinations thereof. The list of possible uses for wireless communication is not meant to be exhaustive, any function that utilizes the light conduit light features and wireless communications is possible. Examples of controlling devices for mode programming include, but are not limited to, cell phones, tablet computers, custom built remote devices and other computer like devices.

In yet another embodiment, the mode selection is controlled via infrared communication, said communication utilizes the same light path used for measuring ambient light (light conduit distal end to light sensor) to receive encoded light pulses according to a protocol. The protocol is not particularly important and could be similar to those used in remote controls for electronic devices such as televisions and cable boxes, or a custom one. Again, it would be compatible with USART peripherals of microcontrollers. The reception could occur after the light flash sequence which indicates the operating mode is complete. It could likewise occur anytime the light is not on. Likewise, an infrared light source emitting into the light conduit could be used to transmit microcontroller information, thus enabling two-way communication via infrared.

Said two-way communication with other light conduit multifunction lights via infrared comprises additional features such as synchronous flashing, turning on or off, sequential light emission, exchange of data, firmware updates and combinations thereof. The list of possible uses for infrared communication is not meant to be exhaustive, any function that utilizes the light conduit light features and infrared communications is possible. Controlling devices comprise any device operable to emit, receive and combinations thereof infrared pulses according to a protocol used by the invention.

Operation

The following is implemented (Referring to FIG. 3) via a microcontroller 6 which comprises an EEPROM nonvolatile memory which survives power loss and power up detection POR capability. The nonvolatile memory stores the operating mode:

Upon powerup detection, the microcontroller flashes the light on and off via the LED driver 5, the number of light flashes corresponds to the operating mode. The duration of the flash is programmed to be greater than what is necessary so that it is recognizable to humans. Humans are generally regarded to be able to see flashes with a duration greater than 10s-20s of milliseconds, although that may vary with the person and the duty cycle. A second of duration is adequate, but that is just an example, not a specification. Any flash duration that humans can perceive and does not introduce excessive delay in power up sequence time is acceptable. After the flash sequence has ended, the mode is incremented in the nonvolatile memory. A timer within the microcontroller is started such that if it expires (that is power is not removed), the mode stored in EEPROM is decremented to what it was at previous powerup.

If power is removed before the timer expires, the next mode remains in the EEPROM nonvolatile memory. The duration of the timer is not critical and is tailored to human perception and reaction times. To minimize the possibility of unintentional mode change, more than one of the previous sequences could be required to change the operating mode. Another method to minimize unintentional mode change is to delineate the beginning and end of the timer period. Said delineation could be done by one or more rapid flashes of the light at the beginning and end of said period or alternatively, one or more long flashes at each end of the period.

Since the operating mode is stored in nonvolatile memory, it remains the same through power cycling unless and until the mode is changed via the mode changing procedure described above.

In the preferred embodiment, which is focused on boats but not limited to them, there are three operating modes described: auto on at night and off at day, traditional on and off via power application and SOS distress signal mode. This description is not intended to be limiting, other modes are possible.

The auto on at night, off at day is implemented with a light sensor monitored by a microcontroller. The ambient light enters the light conduit distal and is conducted via TIR to the proximal end and further coupled into the light module. The light module contains the light sensor that detects the ambient light, as described previously. When the detected light is below the threshold for nighttime use, the light source is turned on. When it exceeds the threshold for daytime, the light source is turned off. The thresholds for daytime and nighttime use need not be the same. Having different threshold values (hysteresis) minimizes oscillation (turning on and off) of the light around a single threshold value and is therefore desirable, but not necessary.

When the light is off (e.g. starting with high ambient light), the detection is straight forward as described above.

When the light source is on (e.g. starting with low ambient light), any ambient light, including daylight, is small compared to the light source light and the ambient signal is obscured. Therefore, the light source needs to be turned off or greatly reduced in order to accurately sample the ambient light. The issue with that is that the light appears to be flashing to human eyes rather than be constantly on. Navigation lights for boats are required to be on steadily. Flashing lights are typically used for channel markers and other navigation aids and the flashing pattern and timing is prescribed for each.

The Critical Flicker Fusion (CFF) Threshold is the frequency at which a flickering light source appears to be steady to a human. It typically ranges between 30-60 Hz, depending on conditions. Reference Kelly, D. H. (1961)'s study titled "*Visual responses to time-dependent stimuli. I. Amplitude sensitivity measurements*," published in the *Journal of the Optical Society of America*. This means that dark periods shorter than approximately 10 milliseconds are usually imperceptible because the human visual system blends them together, perceiving continuous light. This phenomenon is utilized in televisions by refreshing the screen at 60 Hz (17 milliseconds) to avoid any visual flicker.

To minimize or eliminate the perceived flashing issue the light is turned off for a time that is essentially not perceivable to human eyes and at a low duty cycle. The perception of these "dark flashes" varies with light intensity, ambient light and individual humans. FIG. 5 illustrates the concept for a 1 millisecond dark flash, which is an order of magnitude below the lower end of the CFF threshold. Note that the choice of 1 millisecond is for illustrative purposes and not intended to be limiting. The dark flash may be of any duration and/or duty cycle that complies with the human perception criteria while meeting the ambient light detection.

Referring to FIG. 5, the dark flash period is comprised of the light source being turned off 20, the response time 21 of the light sensor to the change from light source light to ambient light levels, the A/D converter sampling the light source output 22 after the response time, the A/D converter conversion time 23 and the light source being turned back on 24. The light sensor signal shown in 21 in this embodiment has a fast response time—in the 10s of microseconds or less, so as to not be a significant limitation on minimizing the dark flash period. It can be seen from FIG. 5 that the dark flash illustrated in this example could be of half again duration or less. A higher microcontroller could further reduce the time limitation imposed by the A/D conversion process.

Most ambient light sensors do not have response times that are suitable. Many have 10s to 100s of millisecond or more response times. One solution is to use high speed photodiodes with a response time of 100 microseconds or less. Photodiodes are typically most sensitive to light in the near infrared range. The sun emits a broad spectrum of light, including infrared. Reference T.V. Dupont (1992). "The Sun as a Source of Terrestrial Infrared Radiation." *Physics Today*, 45(9), 57-63. Approximately 50% of the sun's total energy reaching Earth's surface is infrared radiation, with a total irradiance of about 1,000 W/m$^2$ on a clear day. Although infrared light is not visible to humans, it correlates to visible light when it comes to sunlight. Near infrared in particular is useful since its transmission through the atmosphere is similar to visible light, especially the longer wavelengths of visible. Therefore, it can be used as a proxy for sunlight and is detectable by high speed ambient light detection devices such as photodiodes.

Detecting infrared light has another advantage in that most modern artificial lights for outdoor illumination do not emit significant amounts of near infrared light (i.e. LED). Reference Nema, P. & Ruifrok, A. C. (2001). "Comparative Study of Outdoor Lighting Technologies." IEEE Transactions on Industry Applications, 37(3), 571-578. Those that emit a significant fraction of their output in the infrared, e.g. incandescent and halogen bulbs, emit only a fraction of sunlight levels. For example, a 100 W incandescent admits around 90 W of infrared. In the case of higher output light types used for street lighting such as High-Pressure Sodium (HPS) and Metal Halide Lamps, a 400 W light outputs infrared light in the 100-200 W range. Reference Nema, P. & Ruifrok, A. C. (2001). "Comparative Study of Outdoor Lighting Technologies." IEEE Transactions on Industry Applications, 37(3), 571-578.

All of these are well below sunlight values of around 1000 W/m. Infrared detection provides substantial immunity from false detection of artificial light as compared to visible or a broad-spectrum light detection.

Outdoor artificial lighting used for area illumination is typically powered by electrical mains and comprises 50-60 Hz components. They may also be powered by PWM DC, which typically has frequency components 10 kHz and above. Sunlight does not contain those modulations of light. Artificial light rejection can be enhanced by filtering the light detection signal for those frequency components. Said filtering comprises requiring multiple consecutive detections, signal averaging, low pass filtering and combinations thereof. Said filters are well known in the art and may be implemented in hardware, software and combinations thereof. FIG. 3, 25 depicts optional hardware filtering of the light sensor signal.

The duty cycle of the detection cycle is not critical and can be varied from perhaps once a minute (could be less) to once every 5 minutes or more. Those are just examples and they can vary over a wide range including hours. The duty cycle is set so as to help minimize human perception and still perform ambient sun light detection.

A second mode of traditional electrical power controlled on/off control is implemented by the microcontroller ignoring the ambient light sensor and turning on the light after the powerup light mode flashing sequence and remaining on as long as power is applied. Obviously, the light turns off when electrical power is removed.

A third mode of SOS visual distress signal generation: The international SOS visual distress signal has a prescribed pattern and duration. It consists of three "dots", followed by three "dashes", followed by three "dots". It is specified in 46 CFR 161.013-7 Signal requirements. The microcontroller implements the visual SOS via timers in compliance with the above by turning the light on and off according to the requirements. A state machine architecture (in software or hardware) is particularly suited to implement the SOS signal generation, but not necessary.

By incorporating the light sensor, microcontroller and nonvolatile memory in the light source module of the light conduit light coupled light, the invention is drop-in-ready to existing designs, that is it is form, fit and function compatible while adding additional functions. It does not require separate installation of the light sensor or the microcontroller circuits. Since it uses the same electrical power wiring and no other wiring, installation is drop in without wiring modification.

Figure 4:
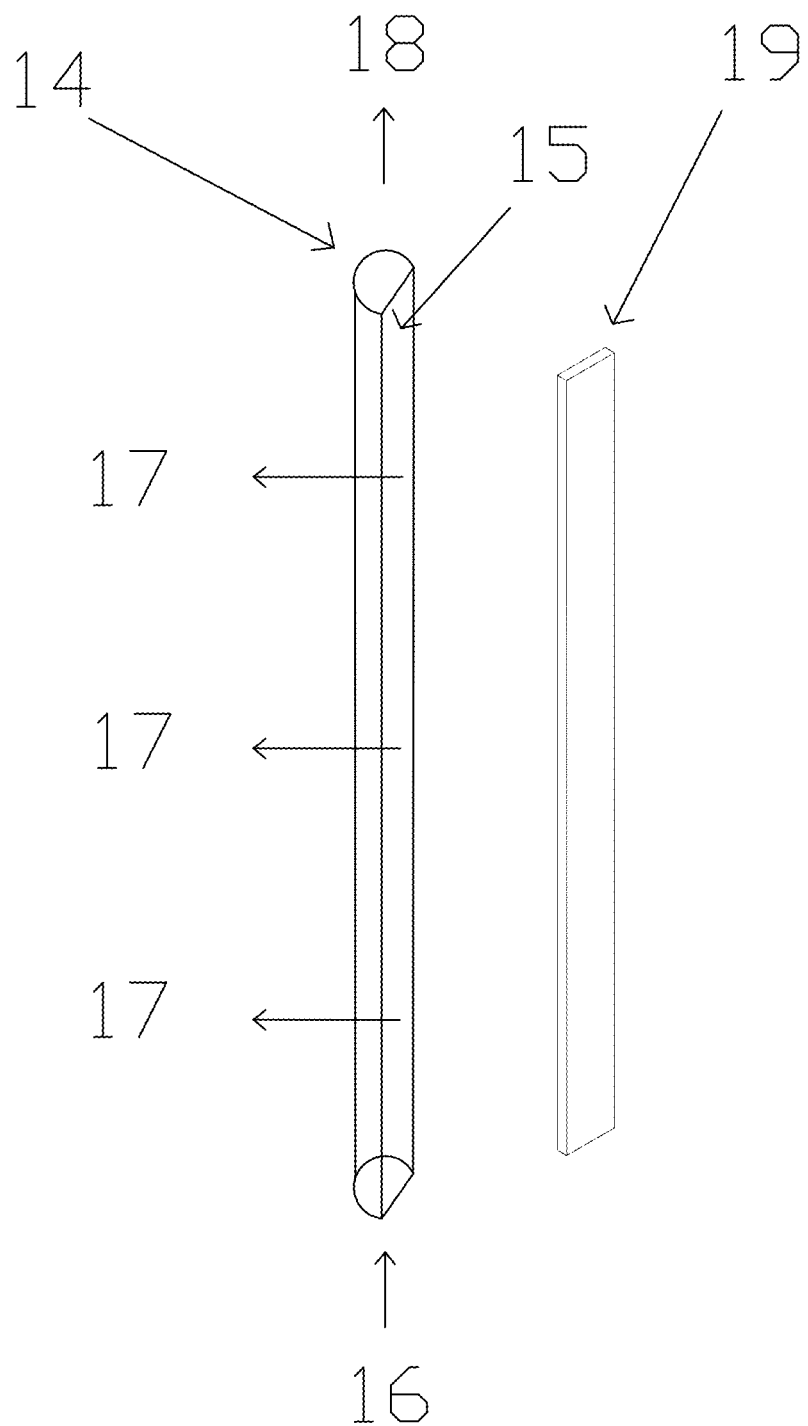

Referring to FIG. 4, another variant of the preferred embodiment which is not a navigation light, but rather applies to general purpose lighting, differs from the previous preferred embodiment light conduit lights in that they purposely frustrate TIR within the light conduit 14 (half-round shape) in order to omit emit light from the light conduit along its length 17, rather than contain it as in 10 of FIG. 1, and emit it at the distal end of the light conduit 1. The light conduit of the frustrated TIR embodiment may comprises various physical shapes which may also contribute to frustrating the TIR. The preferred embodiment of the frustrated TIR light utilizes a half-round 14 which emits a somewhat uniform glow along its length. Other solid shapes include, but are not limited to, rod, rectangular, square and spherical.

TIR may be frustrated by changing the material and/or surrounding medium such that the index of refractions does not meets the criteria for TIR. It may also be frustrated by imperfections or irregularities at the boundary between the two mediums, causing some of the light to scatter or refract 17 and exit the light conduit rather than undergoing TIR. The extent of the light emission 17 along its length determines if any light emerges 18 from the distal end. Various methods can be used to create the imperfection and irregularities at the boundary 15 and can be done so in selective locations and to selective degrees. These include, but are not limited to, abrasion of a light conduit surface, removing portions of a light conduit surface so as to make the surface irregular, adding material to a light conduit surface to make irregular surface and adding material adjacent to a light conduit surface that itself has an irregular surface. It is possible to add a material 19 at the boundary 15 that both alters the index of refraction and adds irregularities at the boundary so as to cause light emission along its length. Examples include, but are not limited to, coatings, aluminum tape and various adhesive tapes and liners.

The method or methods used to frustrate TIR in the light conduit are not important to the invention. Indeed, one or more could be used, according to the type and pattern of the emission desired.

Light conduit lights that utilize frustrated TIR have application in general lighting. Examples include, but are not limited to, landscape lighting, boat interior, car, truck, trailer, RV and off-road vehicle undercarriage and wheel well illumination, building accent and stair step illumination.

As in the TIR light conduit embodiment, the frustrated TIR embodiment is bidirectional regarding light conduction and is otherwise the same as the TIR embodiment described above.

The multifunction light adds new capabilities to navigation lights as well as non-navigation lights which are not anticipated, rendered obvious, suggested, or even implied by any of the prior art boat navigation lights or non-navigation lights, either alone or in any combination.

The invention claimed is:

1. A multifunction total internal reflection (TIR) light device, comprising: a light source,
   the light comprising the visible spectrum, infrared and combinations thereof;
   a light source driver;
   a light sensor that detects ambient sunlight,
   said light sensor of a high speed type, said high speed comprising response times on the order of 100 microseconds or less,
   said light sensor primarily detects near infrared light,
   said near infrared light is a proxy for sunlight,
   said primary near infrared detection operative to minimize artificial light detection and enhance sunlight detection;
   a programmable microcontroller,
   said microcontroller comprising timers, POR (power on reset), ADC (Analog to Digital Converter) and I/O (inputs/outputs);
   an information storage device that retains data through power cycling,
   a light conduit conveys light via total internal reflection (TIR),
   wherein the light conduit facilitates bidirectional light transmission;
   said bidirectionality used to both emit light source light out of the distal end and convey ambient sunlight to a light sensor at the proximal end;
   a module located at the proximal end of the light conduit, said module comprising the light source that emits light as well as the light sensor,
   the light source driver is controlled by the microcontroller and the light sensor detects ambient sunlight conveyed from the distal end of the light conduit, said microcontroller measures ambient sunlight by turning the light driver off, thereby measuring the ambient sunlight via the light sensor and turning the light on through the driver;
   in one of the operating modes, the on-off-on sequence of operation of the light source involves a dark flash,
   said dark flash duration is an order of magnitude or more below the Critical Flicker Fusion (CFF) threshold of humans,
   wherein the dark flash is shorter than 10 milliseconds,
   said dark flash is imperceptible because it is too short in duration to be perceived by the human visual system, thereby it is perceived as continuous light;
   said dark flash further configured to prevent on-off oscillation of the light source due to light source and light sensor feedback,
   said prevention comprising the light source being turned off when ambient light sensing is performed;
   the plurality of operating modes that can selectable by a user,
   wherein the operating modes are set by inputs to and indicated by the microcontroller, said operating modes comprising storage in the information storage device;
   and wherein the operating modes comprise an SOS mode.

2. The multifunction total internal reflection (TIR) light device of claim 1, further comprising:
   the microcontroller operable to indicate and change operating modes, said mode indication comprising flashing the light on and off at powerup a number of timers corresponding to the present operating mode, said flashing operable to be perceived by humans, said input to change modes comprises removing electrical power during a time window after said mode indication flash sequence has completed.

3. The multifunction total internal reflection (TIR) light device of claim 1, further comprising:
   the microcontroller operable to indicate and change operating modes, said inputs to change operating modes and mode indication comprising wireless communications, examples of said wireless communication include, but are not limited to, Bluetooth, Zigbee and Wi-Fi.

4. The multifunction total internal reflection (TIR) light device of claim 1, further comprising:
   the microcontroller operable to indicate and change operating modes, said inputs to change the operating mode comprising infrared communication, said communication utilizes the light path of the light conduit to receive encoded light pulses via the light sensor, said pulses operable to convey a message to change the operating mode selection, said light path operable to transmit and emit encoded infrared light from a light source, said transmitted encoded light comprising information from the microcontroller.

5. The multifunction total internal reflection (TIR) light device of claim 1, further comprising:
   an automatic on at night, off at day operating mode, where said microcontroller uses the measured output of the sunlight sensor to determine whether to turn the light source on or off, said determination comprising thresholds for light and dark, said thresholds for dark and light having different values, said different values comprising hysteresis so as to avoid oscillations around dark and light thresholds.

6. The multifunction total internal reflection (TIR) light device of claim 1, further comprising:
   a manual mode where the light source is turned on or off solely by applying and removing electrical power.

7. The multifunction total internal reflection (TIR) light device of claim 1, wherein in the SOS mode, the microcontroller causes the light source to be turned on and off by the light source driver, said time on and time off delineated by the microcontroller timer, said delineation operable to generate the light source on and off pattern in compliance with 46 CFR 161.013-7 Signal requirements.

8. The multifunction total internal reflection (TIR) light device of claim 1, further comprising: operating modes for use in runway edge and warning lights, with the programmable microcontroller comprising control of the light source to comply with FAA/ICAO safety standards and signaling.

9. The multifunction total internal reflection (TIR) light device of claim 1, further comprising: encapsulation of the module components to provide waterproofing, corrosion resistance, and efficient heat dissipation for long-term use in harsh marine environments, said module comprising corrosion-resistant material, said material comprising, plastic aluminum, brass, stainless steel and combinations thereof, further comprising an optical window sealed to the outside environment, ensuring long-term optical performance, the combination of light conduit and encapsulated module form a robust, compact and weather resistant multifunction light.

10. The multifunction total internal reflection (TIR) light device of claim 1, further comprising: a filtering mechanism for the light sensor signal operable to reject artificial light modulation frequencies, said filtering comprising multiple consecutive detections, signal averaging, low pass filtering and combinations thereof, said filtering implemented in hardware, software and combinations thereof.

\* \* \* \* \*